Patented Dec. 20, 1927.

UNITED STATES PATENT OFFICE.

HENRY V. DUNHAM, OF BAINBRIDGE, NEW YORK.

ADHESIVE AND PROCESS OF MAKING SAME.

No Drawing.   Application filed August 17, 1925.   Serial No. 50,828.

The present invention relates to the production of a waterproof adhesive from casein and finely powdered leather, especially finely powdered chrome leather, and has for its object the production of a highly waterproof casein glue of the character specified, at a reasonable price. The invention also comprises the production of a base for the making of adhesives by the addition of water, the said base being capable of being shipped in a dry state, and capable of producing the adhesive at the point of use, by the proper incorporation therewith of a suitable quantity of water.

In accordance with the preferred procedure in the present invention, I react upon casein and finely pulverized leather scrap, preferably chrome leather scrap, preferably ground to a fineness of from 200 to 300 mesh, with an excess of lime in the presence of alkali metal compounds capable of reacting therewith (forming a precipitate and liberating caustic alkali), the reaction being accomplished in the presence of water.

The casein and the powdered leather scrap are preferably first incorporated or mixed together, and preferably the lime, sodium salts capable of reacting therewith and water are mixed and allowed to react, it being understood that a substantial excess of lime is present over the amount necessary to react with all the sodium salts present.

While in the above statement I have referred to lime, it will be understood that other alkaline earth metal oxides or hydroxides can be used, although apparently less advantageously. I have referred to sodium compounds, but potassium salts can likewise be used, but apparently without any substantial improvement in the result. The sodium compounds preferably used are, the carbonate, phosphate, silicate and the like, although in some cases borax or sodium sulphate could be used. The corresponding potassium compounds likewise could be employed. I prefer to employ lime and sodium salts, on account of the cheapness as compared with other related compounds.

In order to enable those skilled in the art to practice the present invention, I give the following specific examples, but it is to be understood that the invention is not restricted to these specific examples, as various other examples will readily suggest themselves to those skilled in the art.

*Example 1.*—250 parts by weight, of ordinary commercial ground casein are well mixed with 175 parts by weight, of 300-mesh chrome leather dust. The above mixture is added to 1250 parts by weight of water. These materials are mixed in any suitable stirring device say for about 8 minutes or until the particles are thoroughly wetted. In another receptacle 150 parts by weight of quick lime and 250 parts by weight, of water are mixed together into a smooth cream. This mixture is added to the above mixture of casein, leather scrap and water. The stirring is continued for say about 3 minutes and then 275 parts by weight of silicate of soda solution are added and the mixing continued for about 10 minutes more. The silicate of soda is in the form of a solution of about 40° Bé. The resulting glue is of a smooth uniform texture, easily applied to laminated wood or other surfaces. The veneers dry out in the minimum length of time and show satisfactory breaking strengths when the panels are dry. The panels are also waterproof; they will stand soaking in cold water for 3 days without even the edges separating and will stand boiling in water for 3 hours or more without any evidence of even the edges of the panels separating.

*Example 2.*—The amount of lime in the above example is reduced to 100 parts. The other details remain the same. The glue resulting was tested as above described.

The resulting panels glued with this glue are strong, giving very satisfactory breaking tests and are moisture resistant but not thoroughly waterproof, that is to say, if these panels are soaked in water for 3 days, they will separate to a greater or lesser extent (particularly at the edges) and they will not stand the boiling water test but this formula makes a glue satisfactory for many purposes where moisture resisting is required but absolute waterproofness is not essential.

*Example 3.*—The glue base is first made, as follows: 48 parts by weight of dry casein, 12 parts by weight of finely ground tanned leather scrap, 25 parts by weight of lime, 15 parts by weight of soda ash. These dry materials are well mixed together and the glue base is ready to be used or packed and shipped to be used at the veneer plant.

The glue base is later dissolved in the usual way well known to the art using 2 parts of cold water to 1 part of the dry glue base. Resulting panels made from this glue stood the 3 days' soaking test, 3 hours' boiling test and showed generally a satisfactory glued joint.

*Example 4.*—55 parts by weight, ordinary commercial ground casein, 5 parts by weight finely ground leather scrap, 25 parts by weight lime, 15 parts by weight trisodium phosphate. The material is mixed and handled as in Example 3 and gives a very satisfactory glue which is waterproof and strong.

There appears, from my researches, to be some kind of a chemical reaction taking place between the alkalies and the leather, and the product produced by such reaction seems to have a substantial effect upon the casein, thus, if the leather were omitted in Example 1, the glue would be less strong. The reactions, when leather is used with the casein, are highly involved, and I do not make any attempt to fully explain the same.

I have referred particularly to the use of casein as the protein matter to be used, but in some cases other proteid substances which are soluble in alkaline solutions can be employed, although apparently not so successfully. I have referred to the leather scrap as being ground to a fineness of from 200 to 300 mesh, although I do not desire to restrict myself to this degree of fineness, because in some experiments which I have performed, I have secured satisfactory results with somewhat coarser material. The proportions of leather scrap to casein can be varied somewhat, and I have secured satisfactory results when using as much as 40% of the finely divided leather scrap with 60% of casein.

While ordinarily I have secured the best results when using chrome leather, I will state that satisfactory results have been secured by using ordinary sole leather, such as that tanned by the use of bark extracts and the like, these of course always being used in the form of a fine powder, and not in the form of large pieces, chips, skivings and the like. Leather in substantially pulverulent form is produced as a waste material in the manufacture of many kinds of leather goods such as shoes, and can of course be secured at a relatively low cost.

In some cases I have produced fairly water-resistant adhesives without the use of the sodium or other alkali metal salts. I prefer, however, to use such salts in all cases, they (or the reaction products thereof with the lime) being more reactive on the leather than is lime alone.

Other protein-bearing substances like finely ground meal of the legume seeds, (e. g. soya bean meal) may be substituted in place of the casein used in the formula and process herein claimed. These other protein-containing substances do not make as strong a glue yet are satisfactory for certain classes of work. Thus, I may use finely ground soya bean meal which, though it is high in protein, contains other substances than vegetable protein, which lead to the production of a lower grade adhesive.

I claim:—

1. A waterproof adhesive which comprises the reaction products of casein, alkaline earth metal hydroxid, a soluble alkalimetal compound capable of reacting with such hydroxid in the presence of water, to form a precipitate and caustic alkali solution, and finely powdered leather, the amount of the alkaline earth metal hydroxid being more than sufficient to react with the alkali metal compound.

2. A waterproof adhesive which comprises the reaction products of casein, alkaline earth metal hydroxid, a soluble alkalimetal compound capable of reacting with such hydroxid in the presence of water, to form a precipitate and caustic alkali solution, and finely powdered chrome leather, the amount of the alkaline earth metal hydroxid being more than sufficient to react with the alkali metal compound.

3. A method of making a waterproof adhesive which comprises reacting upon casein and finely powdered leather with alkaline earth metal hydroxid and with a non-acid compound of an alkali metal which compound will react with alkaline earth metal hydroxid, in the presence of water, to form a precipitate and a caustic alkali, the amount of the alkaline earth metal hydroxide being more than sufficient to react with the alkali metal compound.

4. A method of making a waterproof adhesive which comprises reacting upon casein and finely powdered leather with alkaline earth metal hydroxid and with a compound of an alkali metal, which compound is capable of reacting upon alkaline earth metal hydroxid in the presence of water, to form a precipitate and caustic alkali solution, the amount of the alkaline earth metal hydroxid being more than sufficient to react with the alkali metal compound.

5. A base for making adhesives comprising casein, lime, finely powdered leather and a sodium salt capable, when in the presence of water, of reacting upon lime to form a precipitate and a caustic alkali solution, the amount of the alkaline earth metal hydroxid being more than sufficient to react with the alkali metal compound.

6. A waterproof adhesive which comprises the reaction products of fine comminuted leather, casein, alkaline earth metal hydroxid, an alkali metal salt capable of reacting with the latter in aqueous solution to form a precipitate and a caustic alkali solution, and water, the amount of the alkaline earth metal hydroxid being more than sufficient to react with the alkali metal compound.

7. A waterproof adhesive which comprises the reaction products of fine comminuted leather, alkali-soluble proteid material, alkaline earth metal hydroxid, an alkali metal salt capable of reacting with the latter in aqueous solution to form a precipitate and a caustic alkali solution, and water, the amount of the alkaline earth metal hydroxid being more than sufficient to react with the alkali metal compound.

8. A base for making adhesives comprising casein, lime, finely powdered chrome leather and soda ash.

9. A water-resisting adhesive comprising the reaction products of casein, finely divided leather, lime and water.

In testimony whereof I affix my signature.

HENRY V. DUNHAM.